(12) United States Patent
Lam

(10) Patent No.: US 10,031,020 B2
(45) Date of Patent: Jul. 24, 2018

(54) AMBIENT LIGHT SENSING DIE WITHIN AN OPTICAL LENS

(71) Applicant: IDT EUROPE GMBH, Dresden (DE)

(72) Inventor: Ed Lam, Fremont, CA (US)

(73) Assignee: IDT EUROPE GMBH, Dresden (DE)

( * ) Notice: Subject to any disclaimer, the term of this patent is extended or adjusted under 35 U.S.C. 154(b) by 0 days.

(21) Appl. No.: 14/914,379

(22) PCT Filed: Sep. 4, 2014

(86) PCT No.: PCT/EP2014/068826
§ 371 (c)(1),
(2) Date: Feb. 25, 2016

(87) PCT Pub. No.: WO2015/032852
PCT Pub. Date: Mar. 12, 2015

(65) Prior Publication Data
US 2016/0202115 A1    Jul. 14, 2016

Related U.S. Application Data

(60) Provisional application No. 61/873,438, filed on Sep. 4, 2013.

(51) Int. Cl.
*G01J 1/02* (2006.01)
*G02B 6/42* (2006.01)
(Continued)

(52) U.S. Cl.
CPC ........... *G01J 1/0204* (2013.01); *G01J 1/4204* (2013.01); *G02B 6/4295* (2013.01); *G03B 7/09908* (2013.01)

(58) Field of Classification Search
CPC .... G01J 1/0204; G01J 1/4204; G02B 6/4403; G02B 6/4295; G03B 7/09908; H01L 31/0203
See application file for complete search history.

(56) References Cited

U.S. PATENT DOCUMENTS 4,509,849 A * 4/1985 Momiyama ........ G03B 7/09974
396/267
4,666,275 A * 5/1987 Tamamura ......... G03B 7/09908
396/199
(Continued)

FOREIGN PATENT DOCUMENTS

CN         1387066 A      12/2002
CN       100578764 C       2/2006
(Continued)

OTHER PUBLICATIONS

International Search Report for International Application No. PCT/EP2014/068826, dated Oct. 30, 3014.
(Continued)

*Primary Examiner* — Que T Le
*Assistant Examiner* — Jennifer Bennett
(74) *Attorney, Agent, or Firm* — Heslin Rothenberg Farley & Mesiti P.C.

(57) ABSTRACT

An optical lens has a light sensing die integrated into the optical lens. The optical lens is extended compared to a spherical optical lens such that the optical lens is elongated in order to allow for placement of the ambient light sensing die without causing any blocking or distortion of the optical lens. The shape of the optical lens and the placement of the ambient light sensing die is compensated for the change in shape compared to a spherical optical lens thus allowing for correct focal length parametrics.

7 Claims, 2 Drawing Sheets

(51) Int. Cl.
G03B 7/099 (2014.01)
G01J 1/42 (2006.01)

(56) References Cited

U.S. PATENT DOCUMENTS

| | | | | |
|---|---|---|---|---|
| 4,732,446 A | * | 3/1988 | Gipson | G02B 6/2817 361/679.4 |
| 2006/0016970 A1 | * | 1/2006 | Nagasaka | G01D 5/305 250/231.13 |
| 2006/0018608 A1 | | 1/2006 | Mizoguchi | |
| 2009/0200957 A1 | | 8/2009 | Fukasawa | |
| 2011/0057129 A1 | * | 3/2011 | Yao | G01S 7/4813 250/552 |
| 2011/0204233 A1 | | 8/2011 | Costello et al. | |
| 2013/0187027 A1 | | 7/2013 | Qiao et al. | |
| 2013/0248691 A1 | * | 9/2013 | Mirov | G01J 1/32 250/214 AL |
| 2014/0293124 A1 | * | 10/2014 | Chen | G01J 1/4204 348/373 |

FOREIGN PATENT DOCUMENTS

| | | |
|---|---|---|
| CN | 101164011 A | 4/2008 |
| CN | 202903330 U | 4/2013 |
| CN | 203132695 U | 8/2013 |
| DE | 21 58 360 A1 | 6/1973 |
| KR | 2012 0087779 A | 8/2012 |
| TW | 275112 B | 5/1996 |
| TW | 200618344 A | 6/2006 |
| WO | 2012/122411 A1 | 9/2012 |
| WO | 2012122411 A1 | 9/2012 |

OTHER PUBLICATIONS

Office Action issued in corresponding Chinese Patent Application No. 201480048520.8, dated Dec. 29, 2016.

Search Report issued in corresponding Chinese Patent Application No. 201480048520.8.

* cited by examiner

AMBIENT LIGHT SENSING DIE WITHIN AN OPTICAL LENS

CROSS REFERENCE TO RELATED APPLICATIONS

This application is a national stage filing under section 371 of International Application No. PCT/EP2014/068826, filed on Sep. 4, 2014, and published in English on Mar. 12, 2015, as WO 2015/032852 A1 and claims priority of U.S. Provisional application No. 61/873,438 filed on Sep. 4, 2013, the entire disclosure of these applications being hereby incorporated herein by reference.

FIELD OF THE INVENTION

The present disclosure relates to an optical lens with ambient light sensing (ALS).

PRIOR ART

Typical solutions have the ALS as a separate module near the optical/lens module.

US 2013187027 relates to an image sensor having an image acquisition mode and an ambient light sensing mode including a pixel array having pixel cells organized into rows and columns for capturing image data and ambient light data. Readout circuitry is coupled via column bit lines to the pixels cells to read out the image data along the column bit lines. An ambient light detection ("ALD") unit is selectively coupled to the pixel array to readout the ambient light data and to generate an ambient light signal based on ambient light incident upon the pixel array. Control circuitry is coupled to the pixel array to control time sharing of the pixels cells between the readout circuitry during image acquisition and the ALD unit during ambient light sensing.

CN202903330 (Application #: CN20122550566U 20121024) discloses an ambient light detection circuit for a camera, which is mainly used for ambient light illuminance detection, and outputs a control signal, wherein the control signal can be used as a linkage signal for controlling the on and off of an infrared lamp, switching an optical filter and converting the day and night modes of the camera. The ambient light detection circuit comprises an ambient light detection module used for sensing ambient light and generating a corresponding detection signal, a time-delay module used for performing time-delay filtering on the detection signal generated by the ambient light detection module, and a driving module used for receiving the detection signal processed by the time-delay module and correspondingly generating a control signal for controlling the action of the camera. The ambient light detection circuit for a camera is simple in design, stable in performance, strong in flexibility, low in cost and strong in practicality; can avoid the conditions of mis-triggering the infrared lamp and the video image of the camera due to the existence of instantaneous light interference at night; and is suitable for a plurality of types of cameras.

However, ambient light sensing is implemented in a separate module from the image sensor, thus leading to a hardware overhead.

DISCLOSURE OF THE INVENTION

It is a technical objective to provide a compact solution to optical light sensing.

The present solution relates to an optical lens with an optical light sensing die integrated into the lens or lens module. Thus, the ALS function is integrated into the optical/lens module. The ALS die is molded into part of the lens structure which is part of the optical/lens module thereby eliminating the ALS module as a standalone module.

Communications and connections from and to the ALS die are made via a ribbon or flexible cable connection from the die leading to the outside of the optical lens or through a lens assembly.

The optical lens with integrated ambient light sensing thus reduces the size of any product comprising a camera utilizing ambient light sensing (ALS) to measure the incoming light for camera adjustments.

BRIEF DESCRIPTION OF THE DRAWINGS

Reference will be made to the accompanying drawings, wherein.

DETAILED DESCRIPTION

Figure 1:
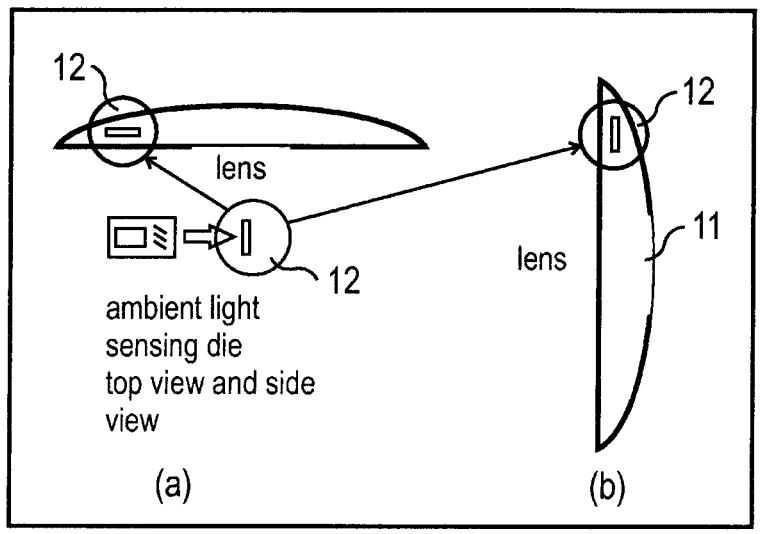
FIG. 1 shows a first embodiment for the integration of an ALS die into a lens.

In FIG. 1, the ALS 12 is imbedded inside the lens 11. The figure shows the lens from different angles, FIG. 1(a) top view and FIG. 1(b) side view. Assuming the lens 11 is spherical, the ALS 12 is imbedded near the edge of the lens, but is fully encapsulated inside the lens 11. A ribbon cable exits the lens and is connected to the ALS to provide connectivity to the ALS and the outside world.

Figure 2:
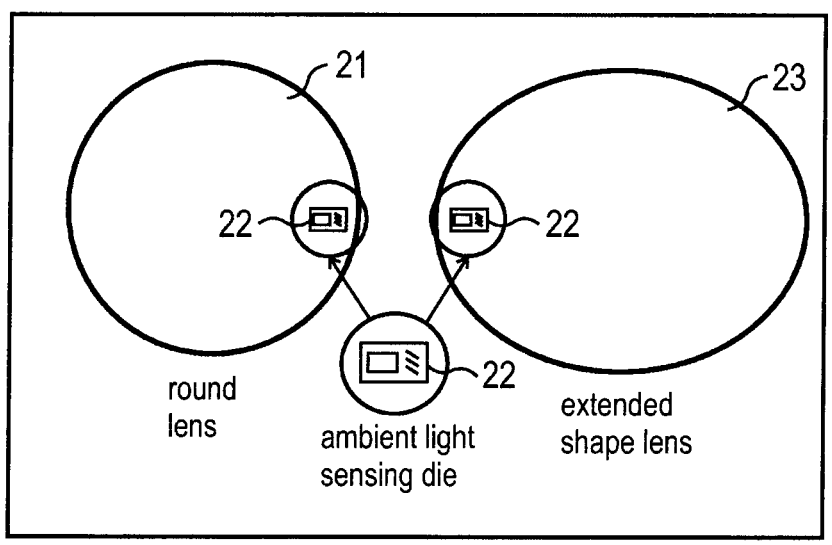
FIG. 2 shows a second embodiment for the integration of an ALS die into a round lens and an extended shape lens.

In FIG. 2, the ALS is shown looking down at the lens. The ALS is positioned near the edge of the lens. In the round lens 21, the ALS 22 is located near the edge and is fully encapsulated. In the extended shape lens 23, the lens has been elongated in order to allow for the ALS 22 placement without causing any blocking or distortion of the lens. The lens design is compensated for the change in shape thus allowing for correct focal length parametrics. In the elongated version, the ALS 22 is fully encapsulated. In order to allow connectivity to the ALS 22, a ribbon cable is connected to the ALS 22 and then exits through the side of the lens.

Figure 3:
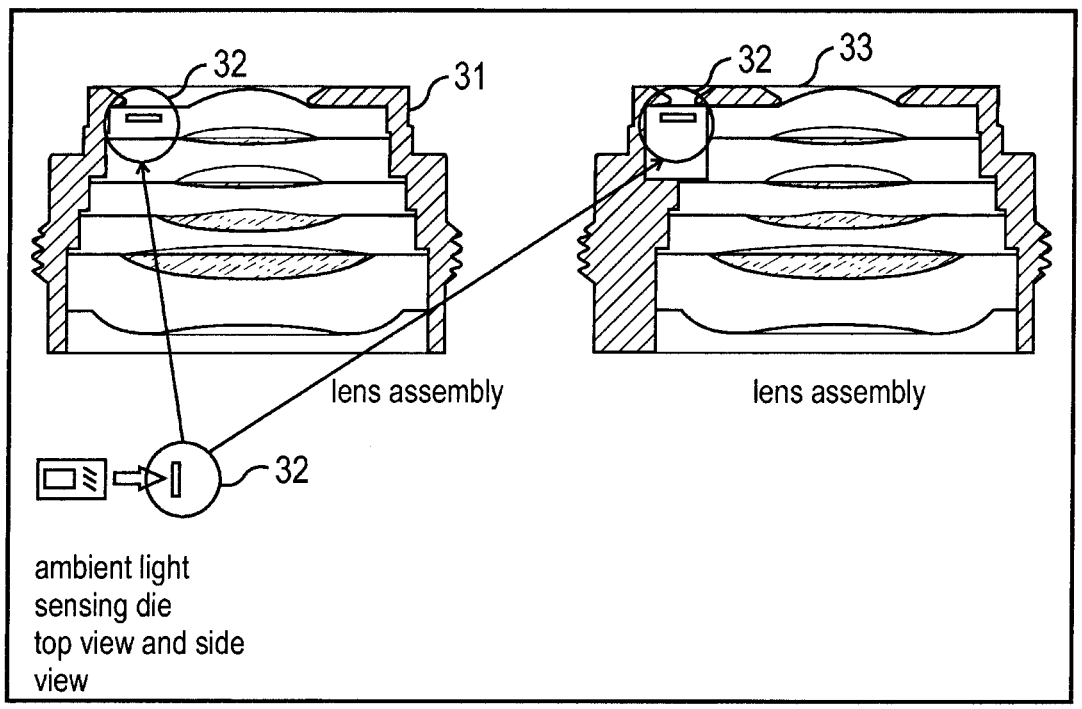
FIG. 3 shows a third embodiment for the integration of an ALS die into a lens assembly.

In FIG. 3, the lens is a stack of different lens shapes to form one cohesive lens 31. For the lens assembly on the left of FIG. 3, the ALS 32 is fully embedded in the top lens. In the case where the top lens is too thin to encapsulate the ALS, as shown for the cohesive lens 33 on the right of FIG. 3, then an alternative is to extend the lens cap and assembly in order to allow an additional lens next to the lens assembly. The material used is similar to the lens material, but can be modified to use whatever appropriate material necessary to allow the ALS encapsulation while maintaining compatibility with the lens assembly. A ribbon cable is connected to the ALS and exits the lens or lens material in order to allow connectivity to the ALS.

What is claimed is:

1. An optical lens for a camera utilizing ambient light sensing with an ambient light sensing die integrated into the optical lens of the camera, wherein shape of the optical lens is extended compared to a shape of a spherical optical lens such that a portion of the optical lens is laterally elongated relative to an optical axis of the optical lens, and the ambient light sensing die is located within the laterally elongated portion of the optical lens without causing any blocking or distortion of the optical lens and wherein the shape of the optical lens and the placement of the ambient light sensing die is compensated for by the change in shape compared to a spherical optical lens thus allowing for correct focal length parametrics.

2. The optical lens according to claim 1, wherein the ambient light sensing die is fully encapsulated inside the optical lens.

3. The optical lens according to claim 1, wherein a ribbon cable exits the optical lens and is connected to the ambient light sensing die to provide connectivity to the ambient light sensing die and an external terminal.

4. An optical lens assembly comprising a plurality of lenses having different lens shapes to form one cohesive lens, the optical lens assembly comprising a top optical lens according to claim 1, wherein the ambient light sensing die is fully embedded into a laterally elongated portion of the top optical lens.

5. An optical lens assembly comprising a plurality of lenses having different lens shapes to form one cohesive lens, the optical lens assembly comprising an additional optical lens according to claim 1 placed next to the plurality of lenses, wherein the ambient light sensing die is fully embedded into a laterally elongated portion of the additional optical lens.

6. An optical lens according to claim 1, wherein the optical lens has an oval shape.

7. The optical lens according to claim 1, wherein the optical lens comprises an imaging lens of a camera.

* * * * *